(12) United States Patent
Linares

(10) Patent No.: US 11,097,453 B2
(45) Date of Patent: Aug. 24, 2021

(54) HINGE MOLD PROCESS FOR CREATING STRUCTURAL FORMS AND SHAPES

(71) Applicant: Neuvotec, LLC, Auburn Hills, MI (US)

(72) Inventor: Miguel A. Linares, Bloomfield Hills, MI (US)

(73) Assignee: Neuvotec, LLC, Auburn Hills, MI (US)

( * ) Notice: Subject to any disclaimer, the term of this patent is extended or adjusted under 35 U.S.C. 154(b) by 341 days.

(21) Appl. No.: 16/166,347

(22) Filed: Oct. 22, 2018

(65) Prior Publication Data
US 2019/0118429 A1  Apr. 25, 2019

Related U.S. Application Data

(60) Provisional application No. 62/575,612, filed on Oct. 23, 2017.

(51) Int. Cl.
| B29C 43/32 | (2006.01) |
| B29C 44/12 | (2006.01) |
| B29C 44/58 | (2006.01) |
| B29C 33/36 | (2006.01) |
| B29C 33/12 | (2006.01) |
| B29C 44/38 | (2006.01) |
| B29L 31/44 | (2006.01) |
| B29C 33/70 | (2006.01) |

(Continued)

(52) U.S. Cl.
CPC .......... B29C 44/1266 (2013.01); B29C 33/12 (2013.01); B29C 33/36 (2013.01); B29C 44/128 (2013.01); B29C 44/58 (2013.01); B29C 44/388 (2013.01); B29C 2033/705 (2013.01); B29K 2023/06 (2013.01); B29K 2075/00 (2013.01); B29K 2105/04 (2013.01); B29K 2711/10 (2013.01); B29K 2711/14 (2013.01); B29L 2031/44 (2013.01)

(58) Field of Classification Search
CPC ......... B29C 43/00; B29C 43/02; B29C 43/04; B29C 43/32; B29C 43/36; B29C 43/52; B29C 2043/022182; B29C 2043/3411; B29C 44/00; B29C 44/05; B29C 44/12; B29C 44/32; B29C 44/3415
See application file for complete search history.

(56) References Cited

U.S. PATENT DOCUMENTS

| 3,275,720 A | 9/1966 | Ohsol |
| 3,753,843 A | 8/1973 | Hutchison |

(Continued)

FOREIGN PATENT DOCUMENTS

| WO | 0123312 A1 | 4/2001 |
| WO | 0157354 A2 | 8/2001 |
| WO | 2017023764 A1 | 2/2017 |

*Primary Examiner* — Joseph S Del Sole
*Assistant Examiner* — Thu Khanh T Nguyen
(74) *Attorney, Agent, or Firm* — Dinsmore & Shohl LLP

(57) ABSTRACT

A process and assembly for producing a structural article, as well as an article produced according to any process and assembly. A mold has a base and a hinged lid, either or both of which include a cavity interior which defines a negative of the structural article to be produced. A structural insert placed within the mold, prior or subsequent to a plasticized and structural forming foam material also being placed within the mold. The foam cures and sets in encapsulating fashion around the insert so that, upon removal, the insert is coated within the formed material.

18 Claims, 14 Drawing Sheets

(51) Int. Cl.
  *B29K 711/14* (2006.01)
  *B29K 711/10* (2006.01)
  *B29K 75/00* (2006.01)
  *B29K 105/04* (2006.01)

(56) References Cited

U.S. PATENT DOCUMENTS

| | | | |
|---|---|---|---|
| 3,925,587 A | 12/1975 | Park | |
| 4,420,447 A | 12/1983 | Nakashima | |
| 4,508,499 A * | 4/1985 | Spengler | B29C 33/36 |
| | | | 425/112 |
| 4,559,274 A | 12/1985 | Kloppe et al. | |
| 4,573,902 A * | 3/1986 | Heilman | B29C 33/202 |
| | | | 264/236 |
| 5,779,961 A | 7/1998 | Teutsch | |
| 5,814,261 A * | 9/1998 | Steckling | B29C 31/006 |
| | | | 264/297.6 |
| 6,605,326 B2 | 8/2003 | Sherwood | |
| 7,147,745 B1 | 12/2006 | Slaven, Jr. et al. | |
| 7,442,025 B2 * | 10/2008 | Rivera | A23P 20/20 |
| | | | 425/193 |
| 7,510,383 B2 * | 3/2009 | Tabata | B29C 44/351 |
| | | | 249/170 |
| 7,939,156 B1 | 5/2011 | Slaven, Jr. et al. | |
| 7,998,389 B2 | 8/2011 | Burchett et al. | |
| 8,246,898 B2 | 8/2012 | Conrad et al. | |
| 8,419,406 B2 * | 4/2013 | Karlsson | B29C 44/588 |
| | | | 425/149 |
| 8,518,312 B2 | 8/2013 | Katz | |
| 8,932,499 B2 | 1/2015 | Goedecke et al. | |
| 9,962,894 B1 | 5/2018 | McDonald | |
| 2002/0061342 A1 * | 5/2002 | Jensen | B28B 7/0035 |
| | | | 425/234 |
| 2002/0180104 A1 * | 12/2002 | Kobayashi | B29C 70/345 |
| | | | 264/258 |
| 2004/0062908 A1 | 4/2004 | Van Manen | |
| 2008/0023868 A1 | 1/2008 | Slaven et al. | |
| 2009/0139647 A1 | 6/2009 | Bradish et al. | |
| 2009/0155567 A1 | 6/2009 | Sugawara et al. | |
| 2009/0261493 A1 | 10/2009 | Winget et al. | |
| 2010/0178495 A1 | 7/2010 | Taketa et al. | |
| 2011/0001255 A1 | 1/2011 | Tardif | |
| 2011/0135862 A1 | 6/2011 | Sumi et al. | |
| 2012/0021217 A1 | 1/2012 | Hadba et al. | |
| 2012/0261856 A1 | 10/2012 | Pitzolu | |
| 2013/0127092 A1 | 5/2013 | Dauner et al. | |
| 2014/0291883 A1 | 10/2014 | Chou et al. | |
| 2015/0118426 A1 | 4/2015 | Roberts | |
| 2015/0165664 A1 * | 6/2015 | Kobune | B29C 45/4005 |
| | | | 264/328.1 |

* cited by examiner

HINGE MOLD PROCESS FOR CREATING STRUCTURAL FORMS AND SHAPES

CROSS REFERENCE TO RELATED APPLICATIONS

The present application claims priority from U.S. Ser. No. 62/575,612 filed Oct. 23, 2017, the contents of which are incorporated by reference.

FIELD OF THE INVENTION

The present invention relates generally to processes and assemblies for creating structural forms and shapes. More particularly, the present invention discloses a mold process/assembly for creating a structural article, such as within an assembly line operation in which a series of naturally occurring or other substrate articles are loaded into a plurality of arrayed hinge molds for subsequent introduction of a two part curing and foaming material. Additional variants include the production of such as pallets, seats or other articles using manmade substrate materials which are then structurally bound by plastic foam encapsulation or other outer encapsulating structure.

BACKGROUND OF THE INVENTION

The prior art is documented with examples of structural articles, such as which are produced in a plastic molding or other forming process. In instances, the molded or formed article can incorporate a structural supporting core or insert in order to provide the finished with specified properties or characteristics.

A first example of this is depicted in U.S. Pat. No. 4,420,447, to Nakashima, which teaches a process for producing foam moldings with an insert executed in a mold for foam molding consisting of a core block and a cavity block. The process comprises steps of: (a) having a film adhering to and covering the insert on one side thereof where a foam layer is formed; (b) letting the skirt portion of the film to be pinched or sandwiched by the uniting portion of the two blocks while the foaming process is executed on a foamable material; and (c) forming integrally the foam layer on that side of the insert, with the film being retained between the insert and the foam layer to be obtained.

US 200910261493, to Winget, teaches a method and system for making plastic cellular parts and thermoplastic composite articles utilizing the cellular parts are provided. The method includes providing a mold having a mold cavity with an interior surface to define the shape of the cellular part and at least one resin flow path extending from an outer surface of the mold to the mold cavity along with providing first and second sets of projections or pins. The first set of projections extend into the mold cavity from a first direction and the second set of projections extend into the mold cavity from a second direction opposite the first direction. The projections define cells which open to opposing outer surfaces of the cellular part. The method further includes filling the mold cavity, with the projections extending into the mold cavity, with molten plastic resin from the at least one resin flow path and removing the cellular part from the mold cavity of the mold after the cellular part hardens.

US 2013/0127092, to Dauner, teaches a molded multi-layer plastics component with continuously reinforced fiber plies which has a sandwich structure made of an internal structure made of a foam material, embedded between at least two outer plies of fiber composite plastic. Around the periphery of the embedded internal structure the component has a coherent edge made of the fiber composite plastic, formed through peripheral over dimensioning of at least one of the fiber plies with respect to the internal structure. Two alternative production processes are also disclosed for producing the multilayer plastics component.

Finally, U.S. Pat. No. 8,518,312, to Katz, teaches a composite structure is based on a sandwich construction and a one-step molding process. The composite structure or component includes a core layer having two outer layers on each side of the core layer. The outer layers may be composed of automotive interior trim scrap adhered with an isocyanate adhesive composition. Core layer and outer layers are thermally pressed in a single step or process to form the finished structural, multi-layer product. Decorative layers can be added as part of the one-step process. The resulting panels can be used in the manufacture of automotive, construction, furniture and other components.

SUMMARY OF THE PRESENT INVENTION

The present invention discloses a process and assembly for producing a structural article, as well as an article produced according to any process and assembly. A mold has a base and a hinged lid, either or both of which include a cavity interior which defines a negative of the structural article to be produced.

A structural insert placed within the mold, prior or subsequent to a plasticized and structural forming foam material also being placed within the mold. The foam cures and sets in encapsulating fashion around the insert so that, upon removal, the insert is coated within the formed material.

Additional features include an assembly line process incorporating a plurality of individual hinged molds arranged upon a closed loop conveyor. The structural forming foam can further include a two part material introduced into each individual mold upon advancing by the conveyor.

Other features include a first lift and transfer robot for acquiring the inserts and pre-placing them within the molds, along with a second lift and transfer robot for removing the completed coated articles. One or more inspection stations are located between the lift and transfer robots and, following removal of the completed articles, determine the need for cleaning or repairing of each hinged mold following an article forming process or cycle.

Also provided is a removal robot located proximate the main conveyor in proximity to the inspection stations, the removal robot being instructed to remove dirty or damaged molds to a "U" shaped repair conveyor prior to replacing upon the main conveyor prior to initiation of a further operating cycle.

The structural articles each can have a specified shape and size and include any bundled or aggregated manmade or naturally occurring material not limited to any of bamboo, reeds, burlap, fiber strands or the like. The corresponding plasticized material may also include any two part mix composition, polyurethane, polyurea, polyethylene, or bio plastic foam. Alternatively, the material can include any infused filler not limited to a natural or synthetic/man-made fiber.

In other applications, the mold can have an elongated body for receiving a structural insert in the form of a plurality of lengths of elongated bamboo or pre-formed strands for producing an elongated part not limited to a 2×4 or 4×4 beam or an I beam structure. The mold cavity base can further exhibit any configuration of recesses, embossments and/or interior projections for configuring the profile of the structurally supported and coated article.

Other variants include the provision of one or more book molds, each with mating layers for producing a sheet-like coated article. The book mold can possess multiple hinged or stacked layers defining alternating top/bottom cavity profiles on opposite sides for producing a plurality of the sheet-like articles.

Additional versions of the structural insert include any of a ply-fiber sheet or a pallet style article having an upper deck, a lower deck, and a plurality of spacer legs, these further being integrally formed of single article and including any combination of bamboo and ply-fiber materials. The structural insert further includes any bent bamboo, plastic, metal or composite material. The upper deck can further exhibit a cross bias design with overlapping diagonal patterns of structural insert materials.

Yet additional features include interlocking structures configured between underside locations of the vertical spacer legs and surface locations of the lower deck. The interlocking structure can further include resistive/frictional fitting locations between the legs and lower deck, as well as inserting clips associated with the underside locations of the spacer legs, receiving apertures formed in the lower deck seating the clips prior to insertion, from an opposite bottom of the lower deck, of pins for expanding the clips within the apertures.

Other and additional versions include the mold incorporating any of a rotating or vibration inducing mold structure for coating the structural article. The mold can also be heated to facilitate coating and curing of the structural article.

At least one attachment bracket can secure to the structural insert prior to application of the outer foam coating, with the structural insert further configured as a seat or like furniture article having an outer bamboo frame with an interior fiber mesh weave. The outer plasticized foam coating can also exhibit an irregular surface pattern not limited to a plurality of protuberances for providing anti skid support. Finally, the structural insert can be provided as any of a pallet or elongated plyfiber board.

BRIEF DESCRIPTION OF THE DRAWINGS

Reference will now be made to the attached drawings, when read in combination with the following detailed description, wherein like reference numerals refer to like parts throughout the several views, and in which:

FIGS. 10 and 11 illustrate cutaway partial perspective views of varying examples of connection schemes for securing together upper and lower decks of pallet style articles produced according to the present invention, such further including any combination of adhesives, sonic welding techniques or the like;

DETAILED DESCRIPTION OF THE PREFERRED EMBODIMENTS

As previously described, the present invention discloses a mold process/assembly for creating a structural article, such as within an assembly line operation in which a series of naturally occurring or other substrate articles are loaded into a plurality of arrayed hinge molds for subsequent introduction of a two part curing and foaming material. Additional variants will be described and include variants of the present mold assembly for the production of such as pallets, seats or other articles using manmade substrate materials which are then structurally bound by plastic foam encapsulation or other outer encapsulating structure.

Figure 1:
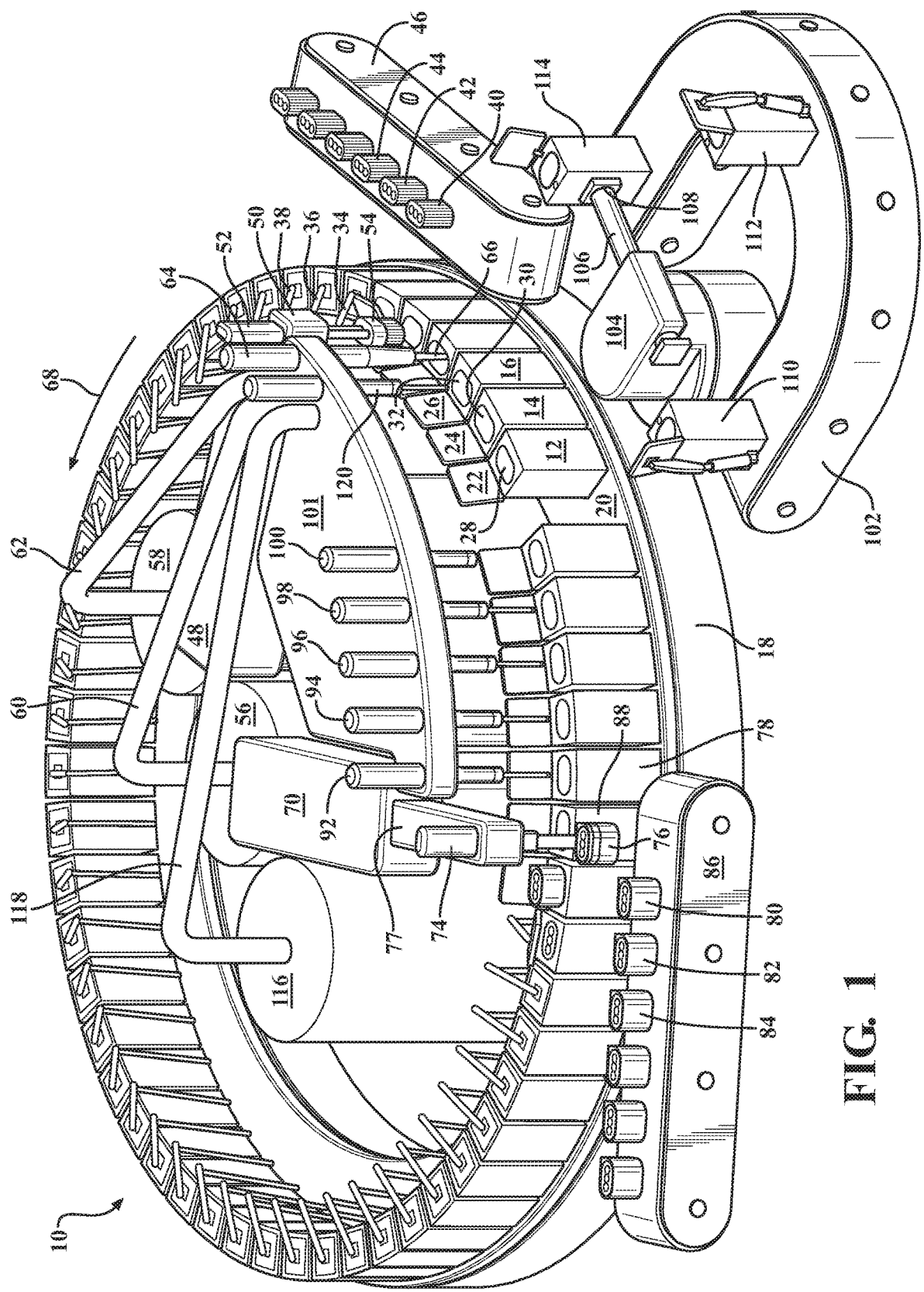
FIG. 1 is a rotary assembly line view of a hinge mold process and assembly for creating a variety of structural forms and shapes, such including inserts of naturally occurring materials being conveyed to a load location in which a numerically controlled robot successively loads into a circular plurality array of individual hinge molds, a two part expandable foam being pre or post injected into the hinge molds for coating both between and around the insert, a further NC robot ejecting the finished part to an outlet conveyor.

Referring initially to FIG. 1, a rotary assembly line view is generally depicted at 10 of a hinge mold process and assembly for creating a variety of structural forms and shapes. The main component of the assembly line is the provision of a plurality of individual hinge molds, these being depicted at 12, 14, 16, et seq., and which are supported in a closed carousal or conveyor support structure, such further including a circular superstructure 18 upon which a closed loop and continuously moving conveyor 20 is located. Although not shown, it is understood that the conveyor includes appropriate speed regulating and driving structure for continuously advancing the plurality of arrayed hinge molds in the closed loop fashion depicted.

As further shown, each of the molds 12, 14, 16, et seq., depict (in one non-limiting embodiment) a three dimensional rectangular shaped main body constructed of a suitable heat resistant material (typically a metal, ceramic or composite) and which includes a flip-top lid (further at 22, 24, 26, et seq.) which, when opened, reveals a cavity interior of the body defining a negative of the completed structural article to be produced (these being further shown at 28, 30, 32, et seq.). Without limitation, the structural inserts are understood to include any suitable material, however may include naturally occurring materials such as bamboo, bamboo strips, burlap, other wood compositions, sugar cane, reeds, fibers, corn stalks or other materials which, when combined with the expandable foam, produces a structural article having the necessary properties of strength and durability. Also shown are hinged levers (at 34, 36, 38, et seq.) associated with each individual mold and configured to pivotally open the lid at a given advanced location to permit introduction of the structural substrate article and of the structural foam or other expandable plasticized/foaming composition.

A plurality of structural inserts, at 40, 42, 44, et. seq. are provided, such as of naturally occurring materials, and which are conveyed upon a delivery conveyor 46 to a load location proximate the closed loop conveyor supported molds. At this location, a numerically controlled lift and transfer robot 48 (with horizontally advancing support 50 and vertically descending/elevating end arm 52 including a bottom most retrieval structure 54) acquires a selected structural insert and is manipulated to load the same into the lid opened and revealed cavity of a selected hinge mold.

A volume of a two part expandable structural foam or other composition is provided, see tanks 56 and 58, each of these having delivery conduits, at 60 and 62 respectively, for pre or post injecting the expandable binder composition into each of the hinge molds, this for coating both between and around the insert. Without limitation, the forming material can be any two part mix composition, such that the materials react or undergo catalysis upon combining, as well as any polyurethane, polyurea, polyethylene, or bio plastic foam. The mixture can also be infused with any natural or manmade filler fibers.

A common delivery manifold is depicted at 64 and which mixes and meters the two part composition for introduction (as a delivery stream shown at 66) into the selected hinge mold. As previously indicated, the manifold 66 is depicted in communication with a hinge mold preceding the lift and transfer robot 48 for subsequently inserting the structural insert, it again being understood that the manifold can alternatively be located at a subsequent station or location relative to the closed loop conveyor 20 (this following insertion of the structural insert) within the scope of the invention.

Upon injecting the two part curable structural foam 66 and loading the structural insert 40 into the selected mold, the hinged lever 34 is caused to close the associated lid, with each mold then being transported in a counter clockwise direction (arrow 68) at a selected speed so as to permit the structural foam to cure and solidify around and between the insert. To this end, the number of molds provided is determined in part by the curing time required by the A-B foam material. The molds can also be heated to blow/expand the foam material and then cooled before ejection.

A second numerically controlled lift and transfer robot 70 includes a similar arrangement of horizontal 72 and end vertical 74 supported and movable arms, a retrieve and deposit band 76 being configured at a lower end of the vertical arm 74. The horizontal arm 72 and vertical arm 74 extends over each hinge mold at a lid opened and unload location (at 78) for unloading and transferring each completed structural article, at 80, 82, 84, et seq., onto a second removal conveyor 86 for removal (the completed structural articles exhibiting many of the same structural properties of building blocks, pavers or the like). The molds can further include internal lift components for partially elevating the structural insert at a preceding location prior to being grasped by the bottom located band 76 (see at location 88).

Following the unloading of the completed structural article, the open lid molds are transferred to successive optical inspection and cleaning stations. These are depicted by optical probes at 90, 92, 94, 96, 98 and 100 directly following the unloading station 88 for assessing the contents of the interior of the molds to determine any irregularities which may require that the mold be removed from the main conveyor for cleaning or repair. The inspection stations are integrated into a structure 101 built into the open interior of the rotary closed main conveyor between the NC load 48 and unload 70 robots.

In the event an inspected mold requires cleaning or repair, the mold is transferred to a further "U" shaped conveyor 102 via a further rotatable NC robotic station 104, this including a boom 106 with an end supported engagement portion 108, such as which among other things can include an electromagnetized plate which, upon placement against the front face of the mold, provides a magnetic attraction for transferring from the main conveyor to the "U" shaped conveyor, see at 110. Regardless of the engagement structure employed, the mold is moved onto the conveyor 102 and can then be manually repaired and/or cleaned (such as at location 112) prior to the mold being conveyed to a reload location 114.

Upon being reloaded onto the main conveyor 20, a post repair/cleaning step includes a further cleaning tank solution 116 (this can include any cleaning chemical) which delivers metered qualities of the solution, via a conduit 118, to a delivery location preceding the foamed composition insert location 66. The cleaning solution can also be delivered at a station 120, and which can also be a separate air cleaning/drying step for prepping the mold for a subsequent structural article forming operation.

Figure 2A:
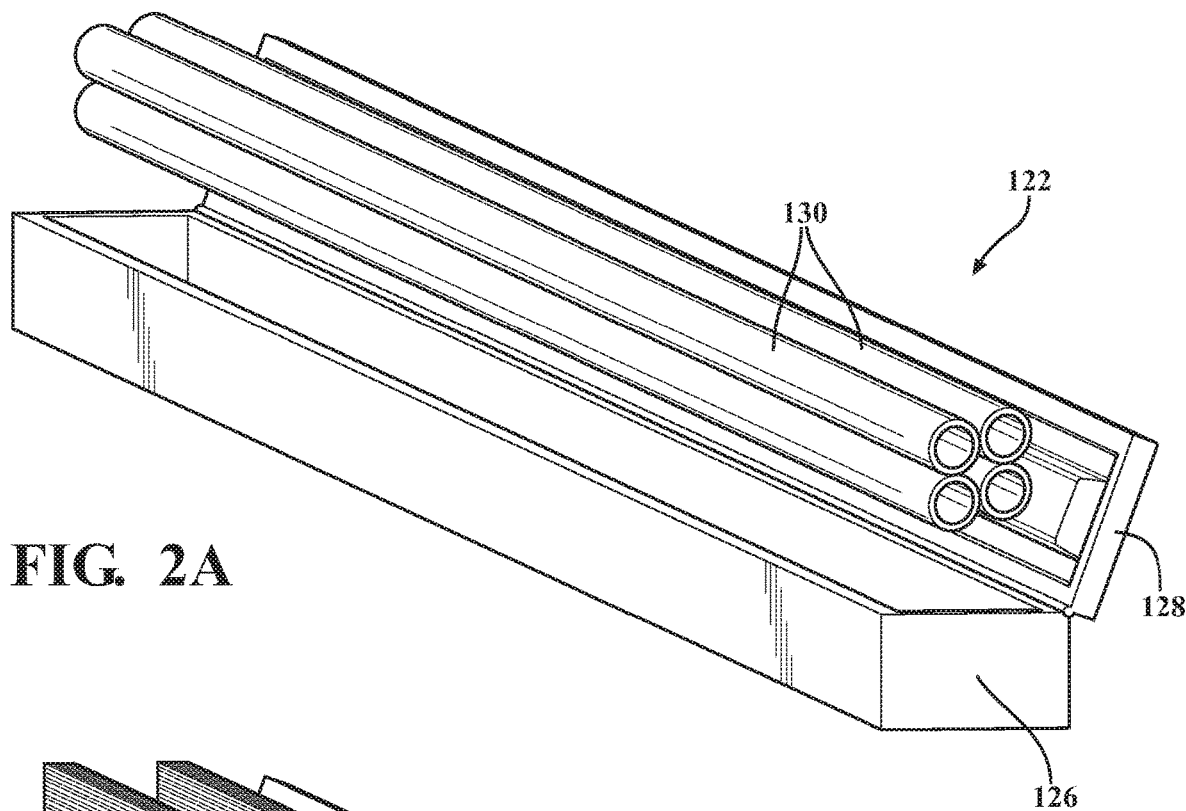
FIGS. 2A and 2B are related illustrations of a pair of hinge molds for producing any type of elongated or I beam style article using any type of naturally occurring (bamboo) or preformed stranded structure.
Figure 2B:
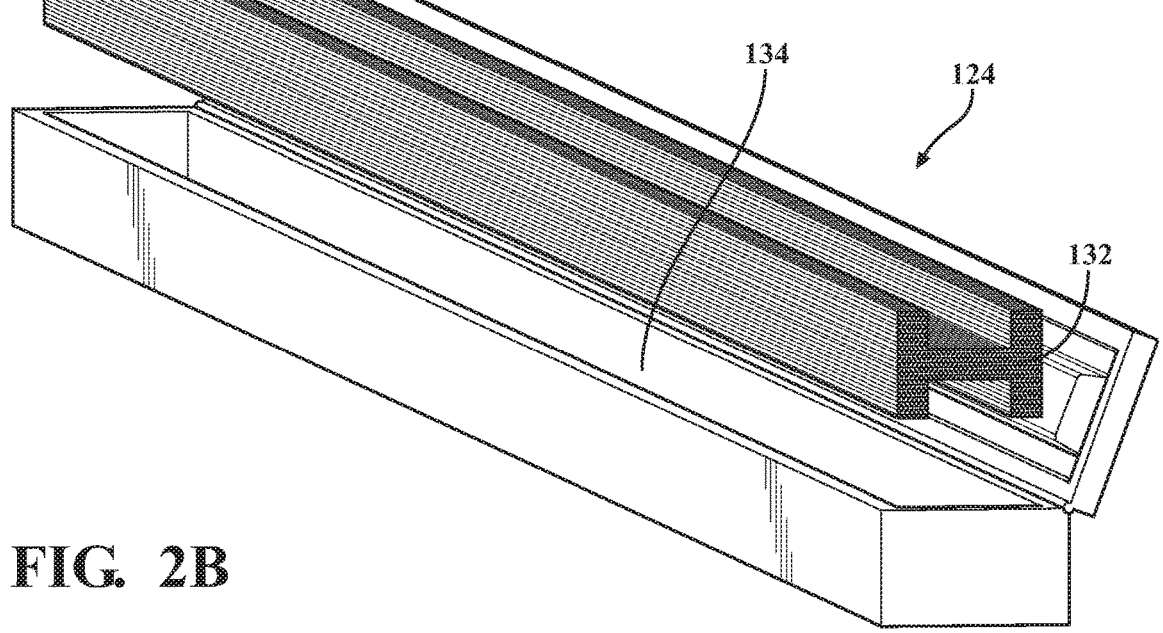

FIGS. 2A and 2B are related illustrations, generally at 122 and 124 respectively, of a pair of hinge molds for producing any type of elongated or I beam style article using any type of naturally occurring (bamboo) or preformed stranded structure. The mold in FIG. 2A includes an elongated receptacle base 126 to which is attached a hinged lid 128. The material construction of the mold can be the same as for the hinge molds in the variant of FIG. 1 and can be integrated into a similar production line, by which a plurality of the elongated substrate articles (in the illustrated instance being a plurality of elongated bamboo 130 lengths of a given diameter) can be deposited into the mold interior. Although not clearly shown, the base interior defines a negative impression of any suitable structural article to be produced, which can include any of an I-beam or other cross sectional profile article.

In the illustrated embodiment, the mold 122 receives a specified volume of the two part or other plasticized expandable structural defining foam material in any manner desired (prior to or following depositing the naturally occurring material substrate), the mold being subsequently heated or another catalyst being introduced in order to expand and solidify the foam material (which can again include a two part polymer composition) in order to expand and structurally solidify the article being produced. In the illustrated embodiment, this can include the production of an elongated beam (such as a 2×4 or 4×4 length) which includes similar or enhanced structural properties as compared to existing wood or steel studs.

The mold 124 of FIG. 2B is similarly constructed in comparison to that in FIG. 2A, with the exception of differences in its interior mold cavity architecture, such as in order to produce an I beam style elongated structural article. To this end, the insert material can include without limitation a preformed stranded structure, see at 132, which is bundled and loaded into the hinged mold interior, the structural foam again being pre or post applied (see at 134 in FIG. 2B) in order to set and expand to create a finished article exhibiting adequate properties simulating that of a steel I beam for use in structural applications.

Figure 3:
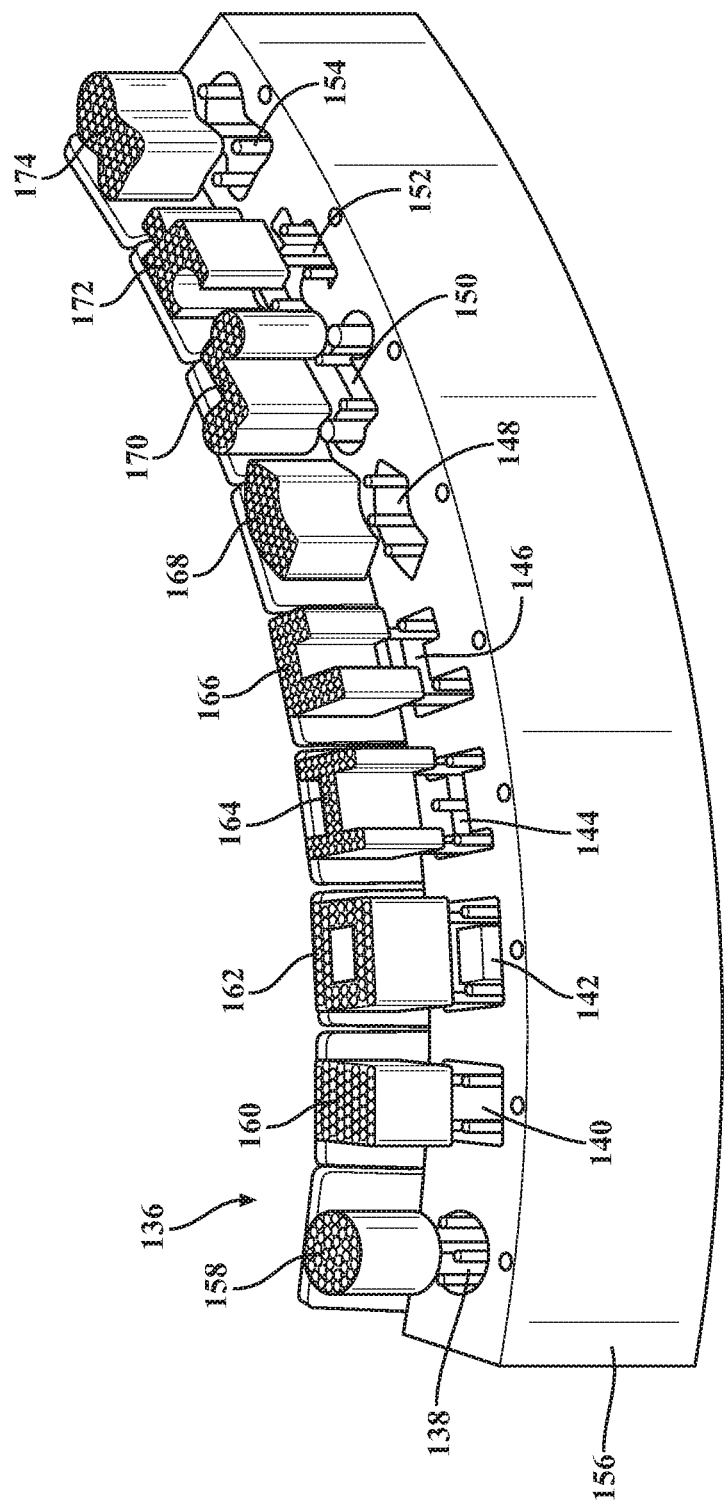
FIG. 3 is a sectional perspective illustration of a variety of hinge molds, such as which can be utilized in the rotary assembly line of FIG. 1 and which can include the introduction of any foaming material not limited to a two part mix or any polyurethane, polyurea, polyethylene or bioplastic foam, such as which can be infused with any fillers or natural/man made fibers.

FIG. 3 is a sectional perspective illustration, generally at 136, of a variety of hinge mold profiles (at each of 138-154) defined within an elongated crescent shaped mold base 156 with individual hinged lids which can be opened and closed as in FIG. 1 (it also being understood that the individual cavities can be defined in separate hinge molds), and such as which can be utilized in the rotary assembly line of FIG. 1. As further shown, each of the cavities 138-154 can include interior locating pin structure (interior posts) for assisting in providing interior positioning and solidifying the pre-inserted structural inserts (such as bunched lengths of bamboo or the like) during subsequent introduction of any fluidic or powder based foaming material (again including without limitation any two part mix of polyurethane, polyurea, polyethylene or bio plastic foam), and such as which can be infused with any natural or synthetic (man-made) fillers or binders.

In this manner, a plurality of varying structural part profiles, see as shown at 158-174 which include a variety of round, square, rectangular, interiorly hollowed and irregular part profiles, are created. As further shown, the individual arrays of vertical posts defined within each of the individual mold cavity interiors are again structurally supporting of the inserted naturally occurring substrate materials before and during expansion of the introduced two part polymer recipe.

Figure 4:
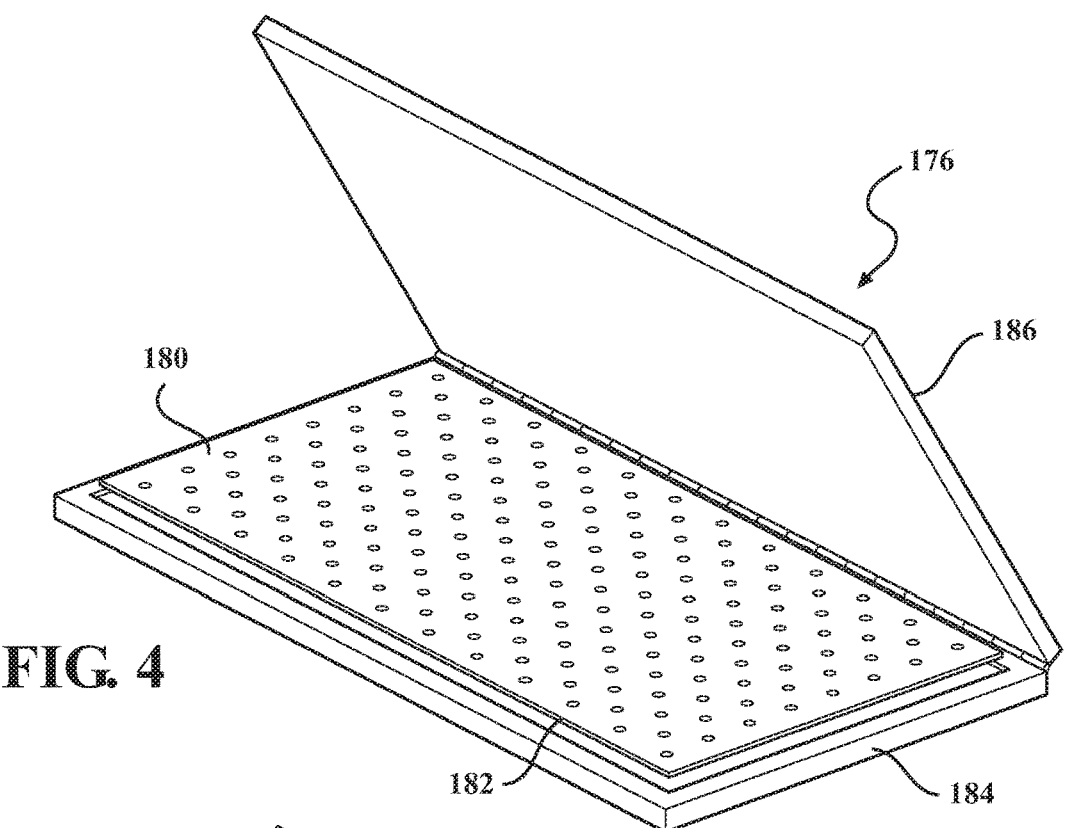
FIGS. 4 and 5 illustrate single and multiple hinge molds reconfigured for forming a planar shaped article having a ply-fiber composition coated by an expandable plastic foam composition.
Figure 5:
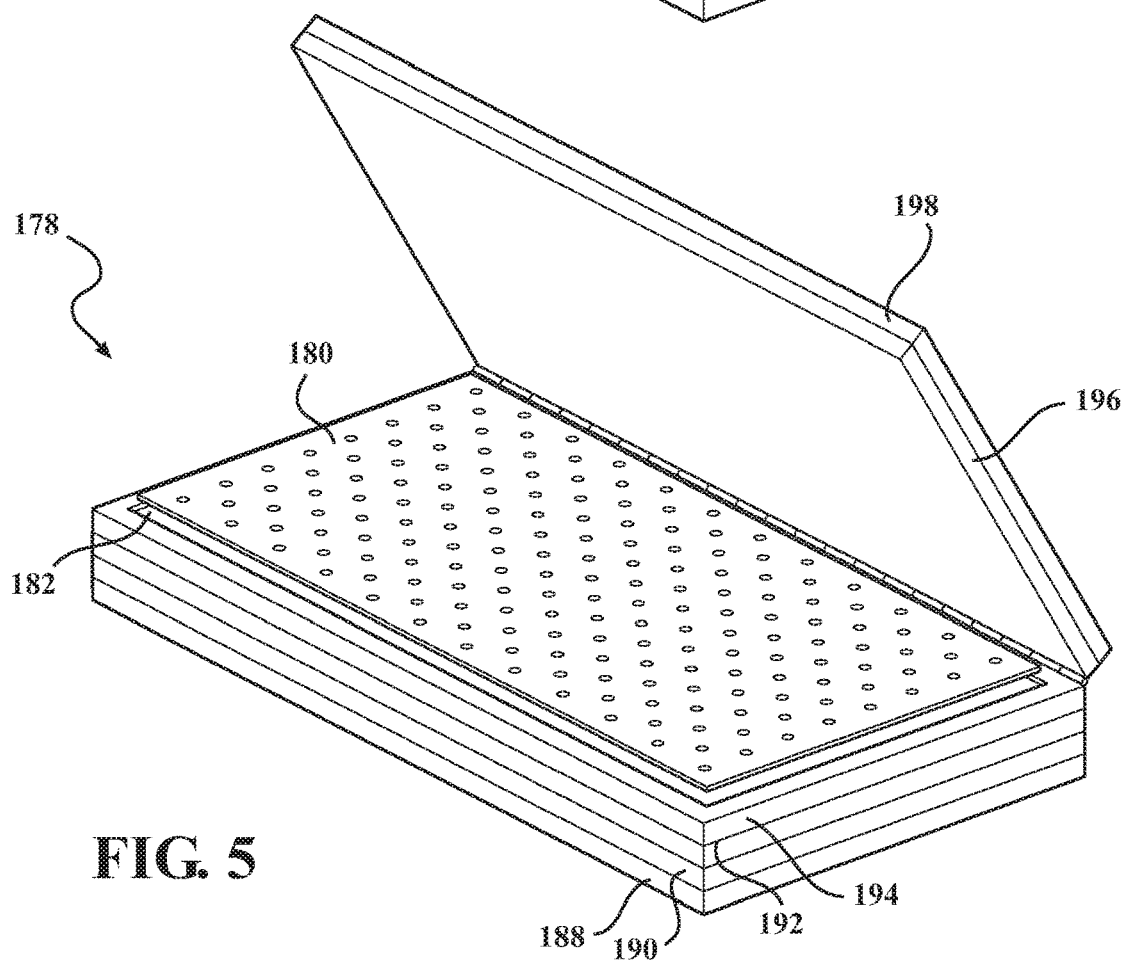

FIGS. 4 and 5 illustrate single (generally at 176) and multiple (generally at 178) hinge molds reconfigured for forming a planar shaped article having a ply-fiber composition (see at 180) coated by an expandable plastic foam composition (at 182). The mold of FIG. 4 is a single planar hinge mold with a shallow receptacle interior cavity defined base 184 and a hingedly attached lid.

The mold of FIG. 5 is a book mold with multiple two sided mold layers, at 188-198, each layer including a base cavity receptacle defined in a first face and a lid receptacle in a second opposite face. In this manner, the hinged and stacked mold layers can be manipulated in plural successive fashion (such as by any assembly line process not limited to that shown in FIG. 1), this in order to introduce the desired two part or other plasticized material to form multiple matching sheet-like articles between each opposing interface associated with the multiple mold layers. This can also include any of heating or other manipulation of the book molds to ensure even distribution and coating of the structural article placed therein. As with the preceding embodiments, the insert material can be substituted by any of those additionally described in order to produce a sheet (flooring, roof, wallboard) style structural material, with the ability to hinge/stack the molds additionally reducing on required floor space.

Figure 6:
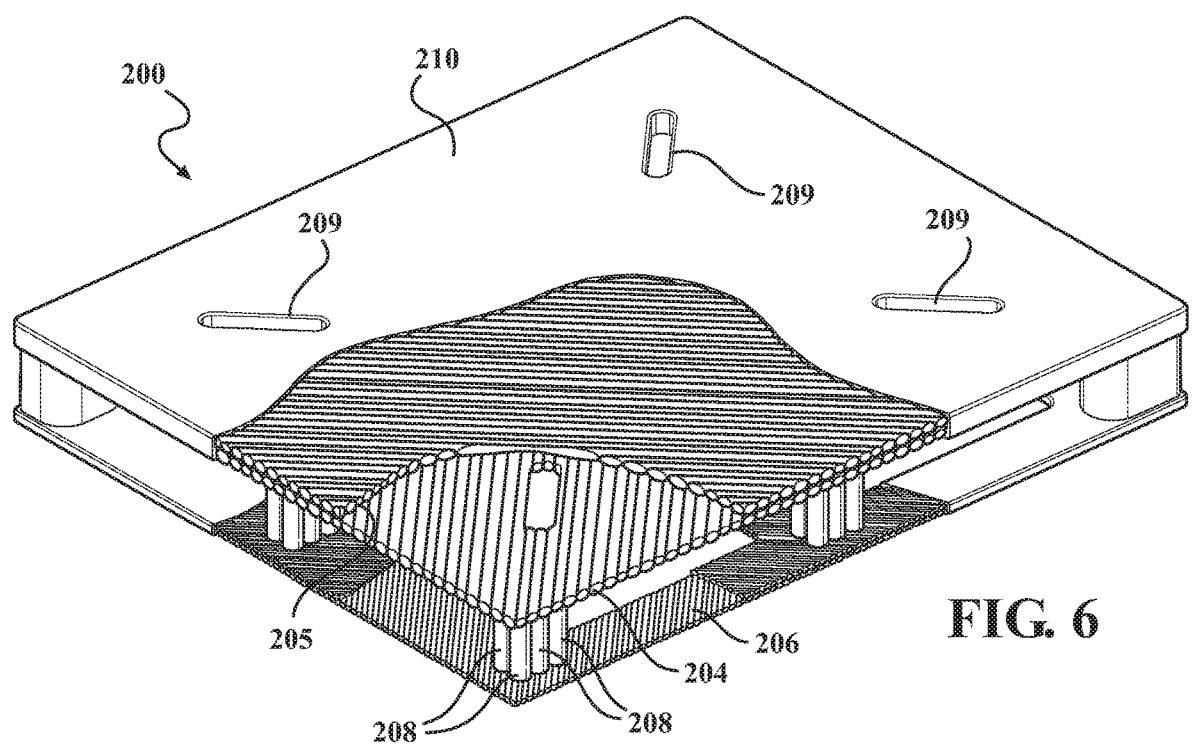
FIGS. 6 and 7 are examples of pallet style articles produced from a substrate including any naturally occurring materials (bamboo, natural fiber strands, as well as mixed with or substituted by any plastic, metal or composite material) and encapsulated with a plastic foam composition.
Figure 7:
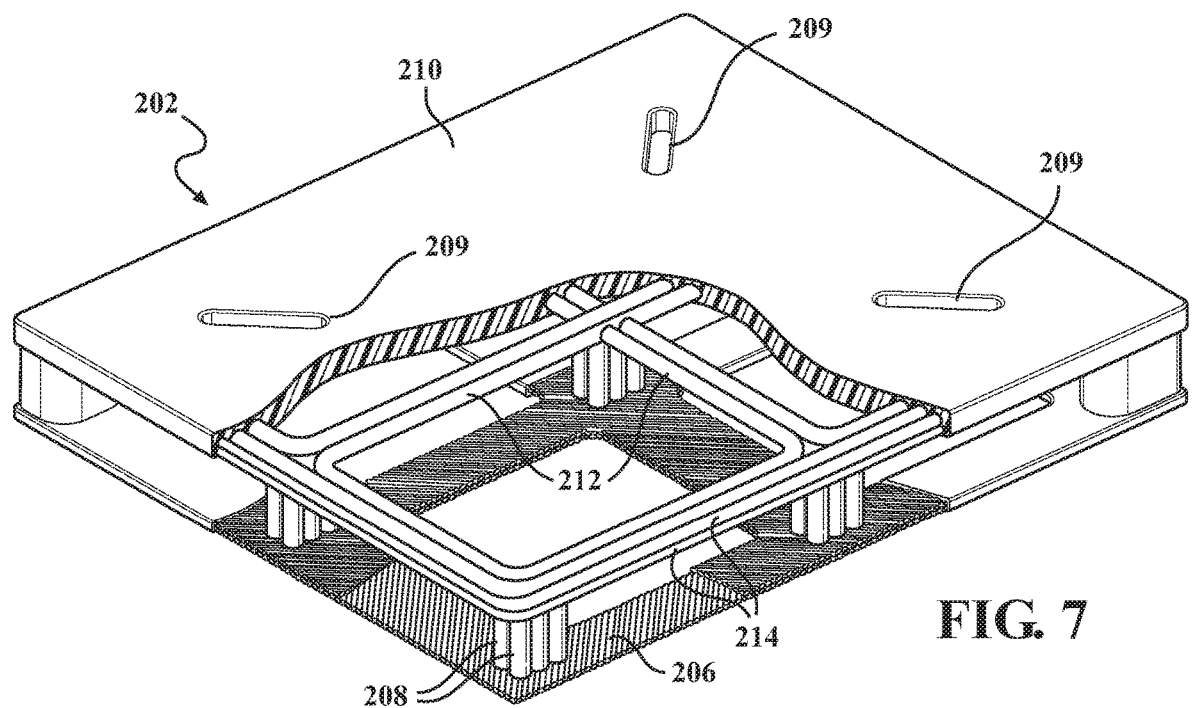

FIGS. 6 and 7 illustrate examples of pallet style articles, at 200 and 202 respectively, which are produced from a substrate including any naturally occurring materials (bamboo, natural fiber strands, as well as mixed with or substituted by any plastic, metal or composite material) and encapsulated with a plastic foam composition. Referring first to the pallet article 200, a structural substrate includes upper 204 and lower 206 decks which are supported and spaced by pluralities of vertically extending vertical portions 208.

Consistent with the previous description, any type of bamboo, natural fiber strand, or other composite structure can be utilized. As further shown, the upper deck 204 exhibits a diagonal pattern of elongated naturally occurring articles of intermediate diameter (these can also be provided in multiple layers as shown in cutaway at 205), with the lower deck 206 exhibiting a similar pattern of smaller diameter materials such as narrower reeds or smaller diameter bamboo (owing in part to the varying the structural supporting demands of the layers).

The vertical column supports defined by the individual pluralities of portions 208 are further located at each corner and intermediate edge location between the decks, as well as at a central interior location. The vertical supports as further shown can constitute shortened and bunched lengths of larger diameter bamboo, these providing the necessary structural interconnecting between the decks. As further shown, the deck can further have hand-holds integrated therein, see at 209, such including either the design associated with the mold for producing the upper deck or, alternatively, a post forming application punch with a mating incised profile for removing the material portions from the upper deck during or after engagement of the various layers and encapsulating with the outer foam material.

A plastic foam encapsulation layer (at 210) is provided for sealing the outer surfaces of the decks 204/206 and the individually bunched vertical column support portions 208. The outer layer can again include any foam or two part composition (such including a curing and/or expanding catalyst) selected from any of the preceding described materials. The pallet article can be produced in a single mold operation, with production of the individual decks and vertical supports also being individually produced utilizing any of the mold structures previously described, and such as which these can be mechanically fastened together post fabrication.

The mold 202 is similar in most respects to that shown in FIG. 6, with the exception that the upper deck includes an alternating pattern 212/214 of structural supporting materials established in a square frame design and which can again include any bent bamboo, plastic, metal, or other composite material (this in contrast to the diagonal overlaying and woven fiber or smaller diameter material designs at 205/209 in FIG. 6). Any similar mold production process and outer foam encapsulation process is also employed in order to create a finished pallet article exhibiting the desired structural and load supporting properties.

As again described, this can include the entire pallet or its constituent parts being produced according to any structural form or shape and including use of foaming and non-foaming materials for encapsulation. The various materials used for encapsulation again include (without limitation) naturally occurring materials such as bamboo, bamboo strips, wood, sugar cane, reeds, and the like. Additionally, natural fibers such as coconut, palm, phragmite, can also be used individually or within a composite structure. Also, metal, plastic, carbon fiber, or any other composite may also be encapsulated within the teachings of this invention.

Figure 8:
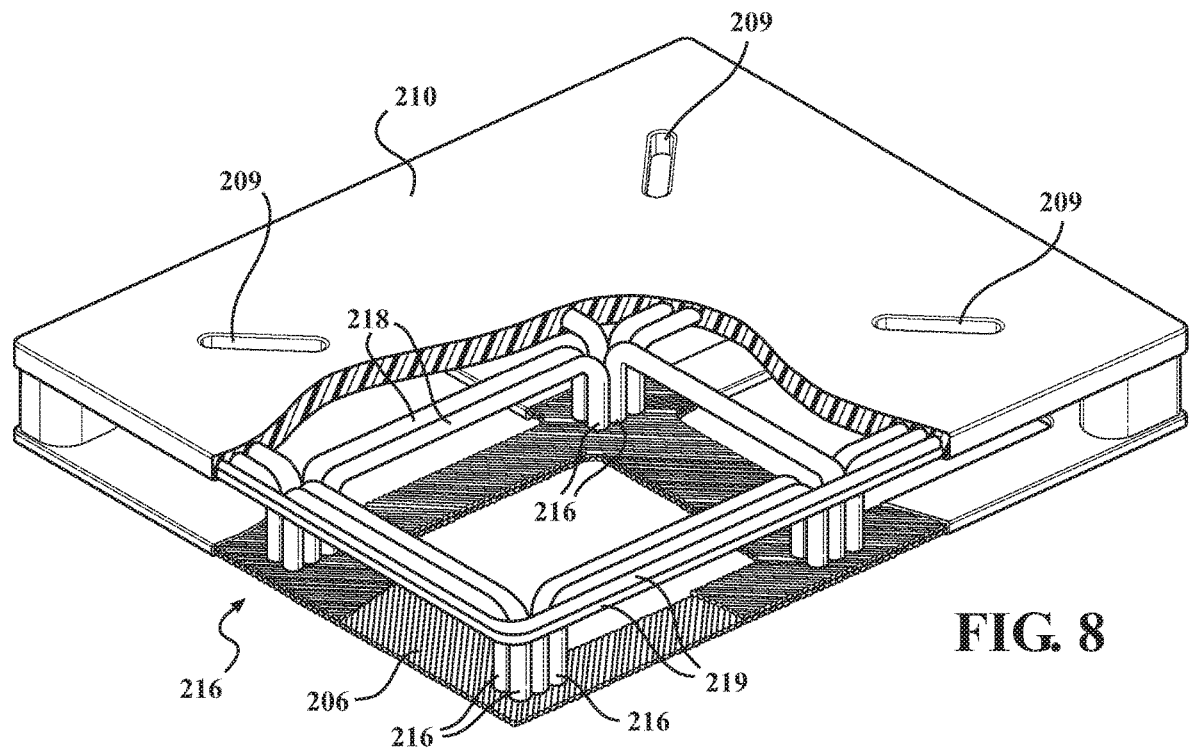
FIGS. 8 and 9 illustrate successive view of a further variant of pallet style article incorporating a variant of structural design of the substrate material which integrates the deck and legs together.
Figure 9:
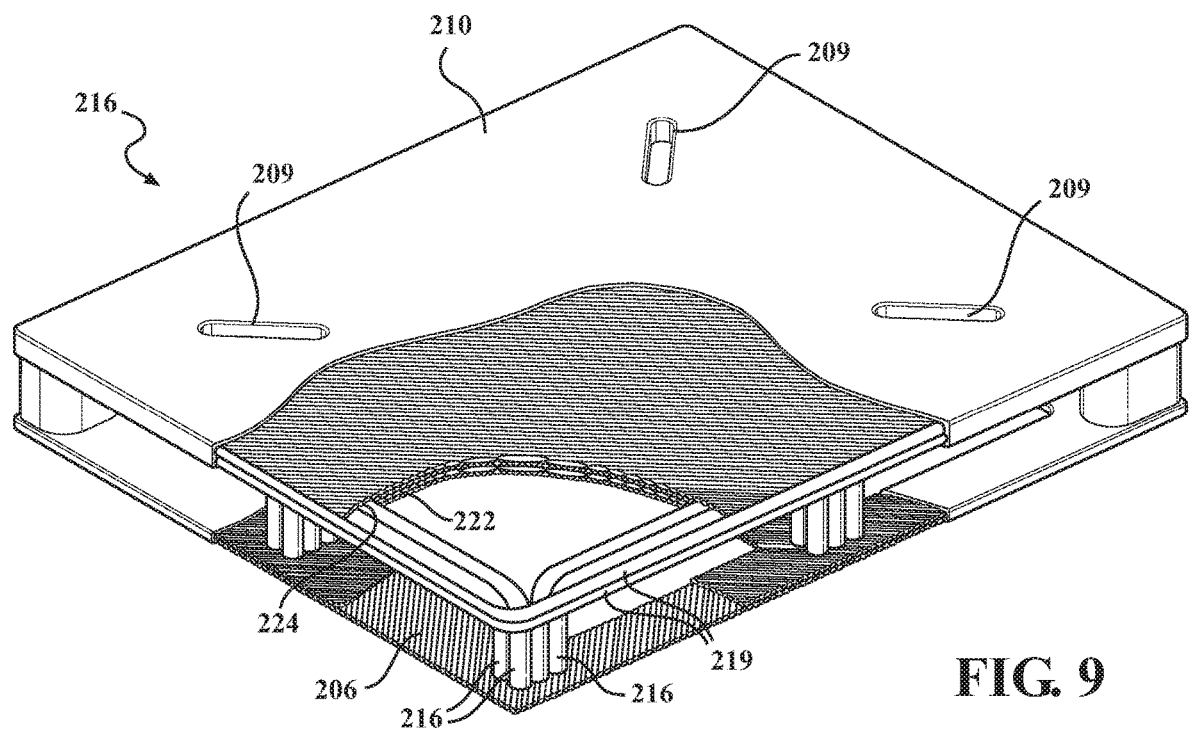

FIGS. 8 and 9 illustrate, generally at 216, successive assembly views in partial cutaway of a further variant of pallet style article, this incorporating individual variants of structural design of the substrate material which integrates the deck and vertically supporting legs together. Much of the structure of the lower deck FIGS. 6-7 are repeated in the variant of FIGS. 8-9. The upper deck is further reconfigured by a modified square grid structure utilizing horizontal 218/219 and interconnecting vertical 220 portions, these collectively integrating together the upper deck and legs.

As further shown in FIG. 9, the upper deck further includes additional woven fiber mat layers, see at 222 and 224, these installed against and around the upper deck grid of substrate materials 218/219, prior to application of the encapsulating two part or other composition plasticized foam material 210. The layers 222/224 can also include any filler material not limited to reeds, bamboo, fiber strands, or any natural or manmade composition which can be incorporated in and around the frame structure depicted.

Figure 10:
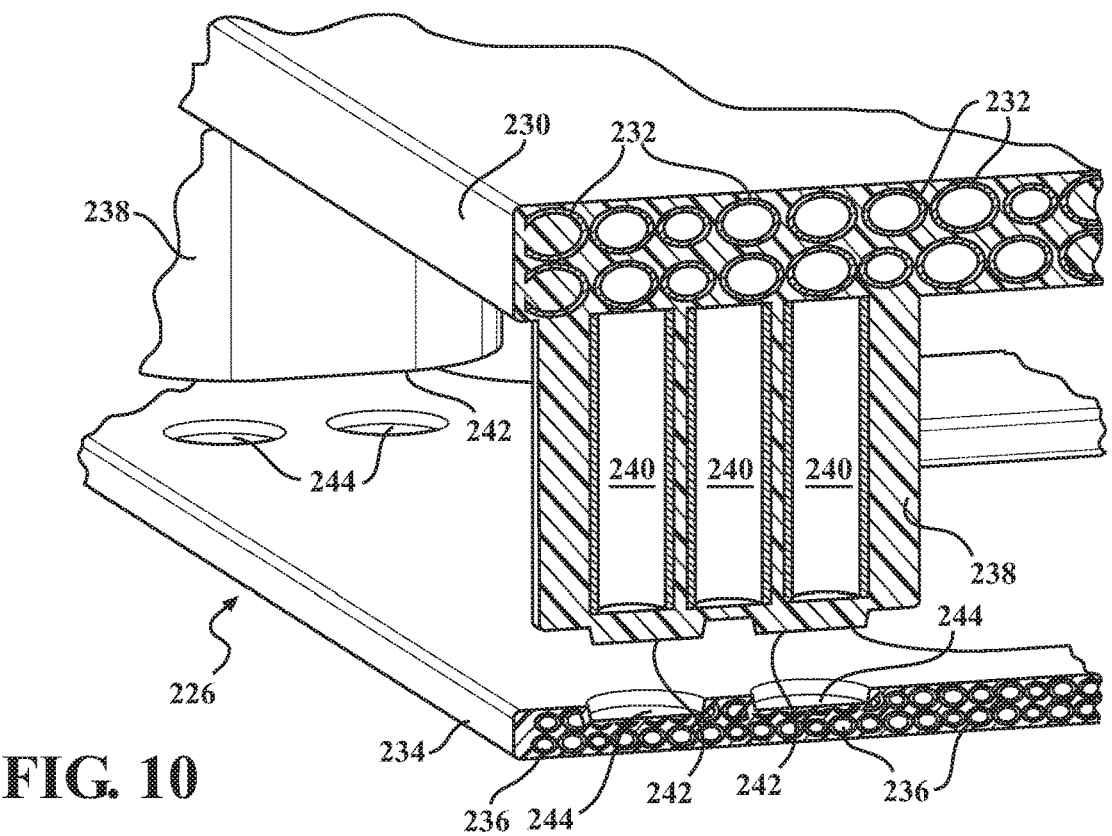
Figure 11:
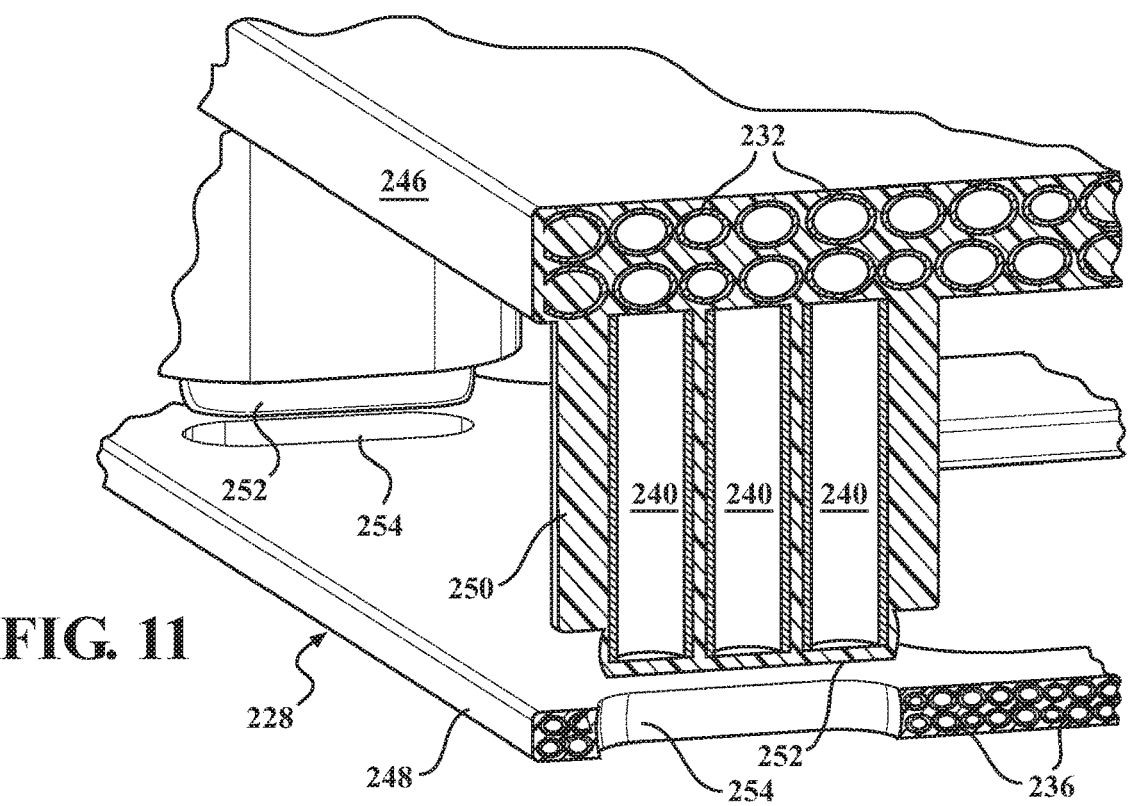

FIGS. 10 and 11 illustrate cutaway partial perspective views, generally at 226 and 228, of varying examples of connection schemes for securing together upper and lower decks of pallet style articles produced according to the present invention, such further including any combination of adhesives, sonic welding techniques or the like. In the instance of FIG. 10, the article 226 includes an upper deck 230 with a structural foam encapsulated pattern of upper bamboo or other naturally occurring substrate inner materials 232, a lower deck 234 of structurally encapsulated (smaller diameter) inner supporting materials 236, and a plurality of vertical interconnecting legs 238 with larger diameter encapsulated supporting materials 240 (largest diameter and shortened bamboo lengths).

As further shown, the upper deck and vertical legs can be formed together in a single operation, the bottoms of the legs further depicting downwardly projecting and slightly tapered protrusions, see at 242, these being resistively engaged within shallow recess profiles 244 configured within the upper surface of the lower deck 234 to assemble the article together. Without limitation, various connection schemes and structures can be utilized in order to attach together the upper and lower decks (as described below with further reference to FIGS. 12-13), such including a Lego style assembly scheme in which the decks are resistively fitted together by pressure engaging the underside leg protrusions into the upper surface recesses configured in the lower deck. Given further the normal direction of force load applications to the pallet article (cargo support upon the upper deck and in no instance is any load force greater than the weight of the lower deck applied to the lower leg attachment interface) such a resistive fitting engagement profile should be adequate alone for supporting and retaining the integrity of the article without the need for separate fasteners.

FIG. 11 illustrates a similar article 228 including an upper deck 246 with a structural foam encapsulated pattern of upper bamboo or other naturally occurring substrate inner materials (again at 232), a lower deck 248 of structurally encapsulated (smaller diameter) inner supporting materials (again at 236), and a plurality of vertical interconnecting legs 250 with larger diameter encapsulated supporting materials (once again depicted by largest diameter and shortened bamboo lengths 240). The variant of FIG. 11 depicts an alternate configuration of leg underside projections 252 which include an arcuate side profile and flat bottom, these being received in a similar frictional or resistive fitting manner within recesses 254 configured into the bottom deck 248 (such as again through the mold design for producing the bottom deck) and in order to provide an effective interlocking scheme such that the decks can be assembled with or without any of adhesives or sonic welding techniques.

Figure 12:
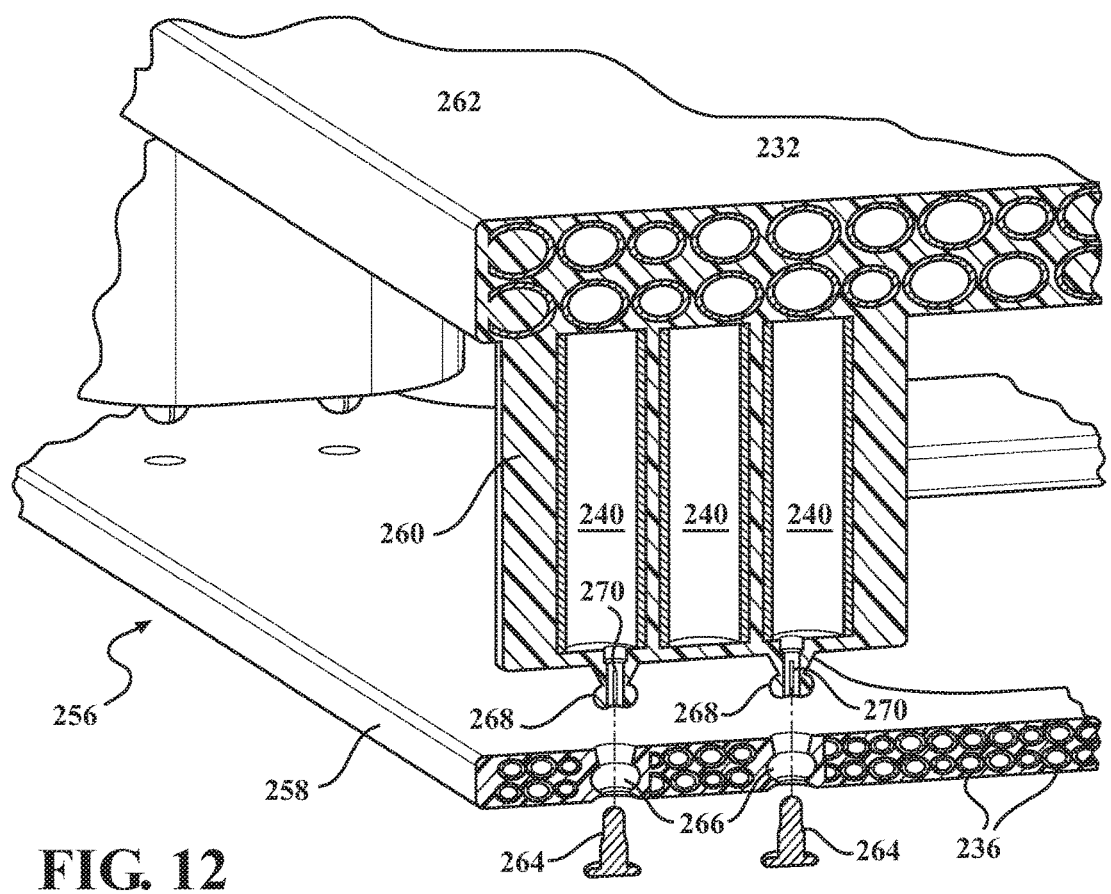
FIGS. 12 and 13 illustrate are successive illustration steps of an installation scheme for securing together a lower deck and opposing columns utilizing pin locks which install through aligning bottom aperture locations of the lower deck and which expand and interlock clips configured into aligning locations of the lower deck for securing the pallet article.
Figure 13:
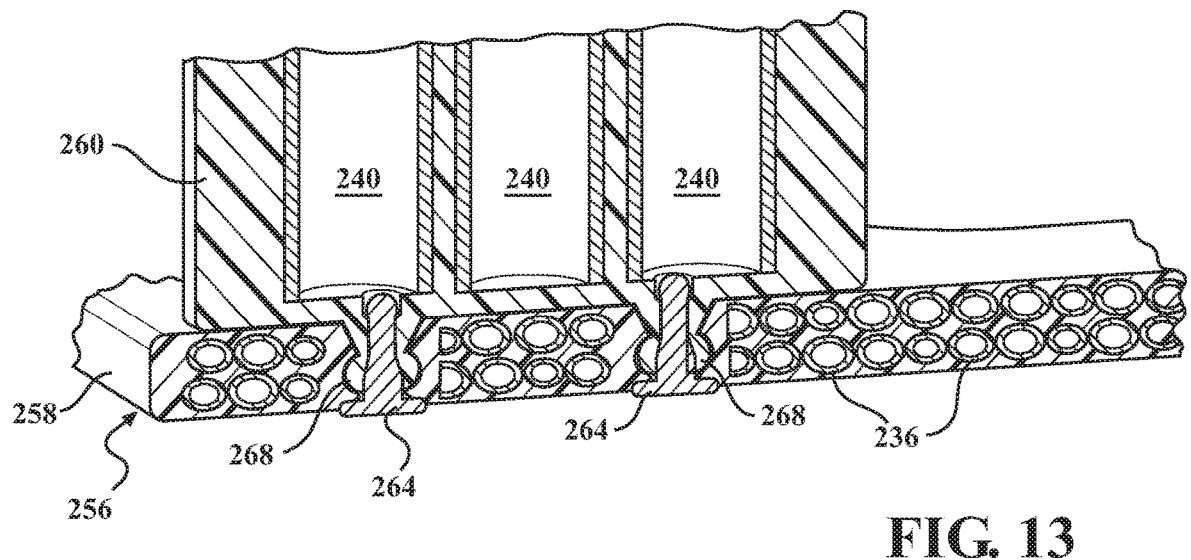

Proceeding to FIGS. 12 and 13, illustrated generally at 256 are successive illustration steps of an installation scheme for securing together a lower deck 258 (similar to that shown in FIGS. 10-11) and opposing vertical legs or columns 262 which are integrated into an upper deck 262. The installation utilizes pin locks (plastic pins 264) which install through aligning bottom aperture locations, at 266 as best shown in FIG. 12, of the lower deck and which, upon installation of the pins as shown in FIG. 13, expand and interlock clips 268 configured into aligning locations of bottom engaging surfaces of the legs 260 for securing the lower deck of the pallet article.

As further shown in FIG. 12, the clips 268 are integrated into the underside of the legs 260 and are split as defined by middle channel 270 such that, upon pre-installing within the aperture profile locations 266, the pins 264 are inserted into the channel 270 from an opposite underside inserting direction in order to cause the extending wings of the clips to expand outwardly into the central expanded or undercut portion of each aperture 264.

Figure 14:
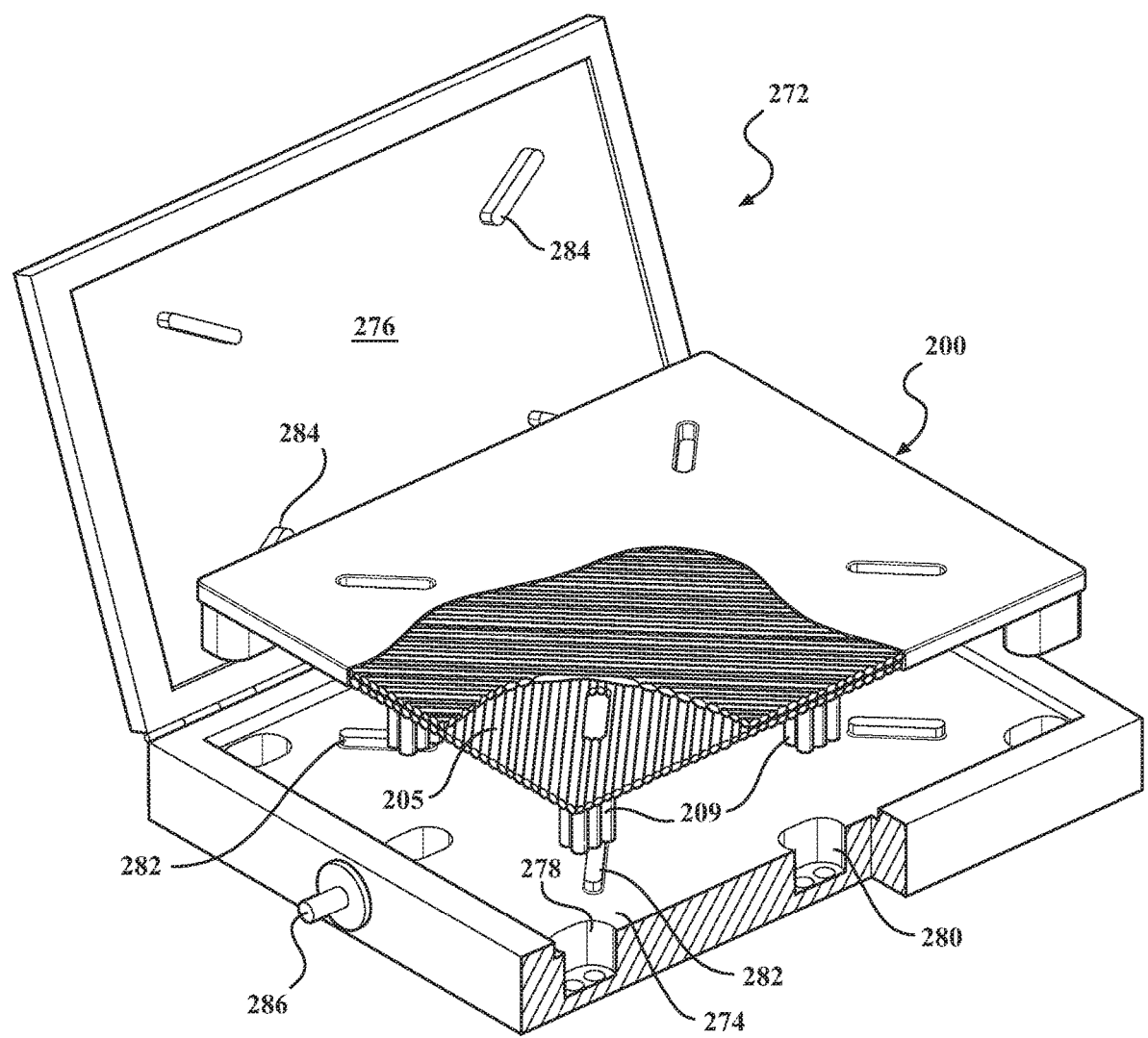
FIG. 14 is a first example of a hinge mold assembly for producing pallet style articles, such including the structural insert of naturally occurring material being mounted into a lower mold body, with plastic powder dispersed from both below and above the insert.

FIG. 14 is a first example of a hinge mold assembly, generally at 272, for producing any type of pallet style article (including any of those previously described), such including the provision of an upper deck 205/209 and integrated legs 208 of structural insert 200 as described in FIG. 6 or any of the related subspecies, this again of naturally occurring material. The mold assembly depicted is of a rotary and/or vibration type mold (the practical effect of which permits speeding up of the dispersion, formation and setting/curing cycle of the two part structural foam.

The structural article 200 is mounted into a matching cavity interior of a base 274 of the mold, such further including a hinged top 276. The cavity interior profile of the base 274 includes a plurality of recessed locations corner 278 and intermediate 280 locations, such for receiving the leg portions of the pallet article substrate. The recessed base surfaces of the locations 278/280 further include additional recess locations 279/281, these defining the frictional or resistive fitting (Lego style) protuberances 242 depicted in FIG. 10. Additional mold surface protrusions 282 are also depicted for forming the hand hold apertures 209 in the upper deck of the pallet article in combination with matching profiles 284 in the lid 276 underside.

Upon loading the upper deck and integrated vertical legs, the mold is capable of being rotated about an axis established by mounting posts 286 extending from opposite aligning side edge locations of the lower mold body, with plastic powder (such as which can be pre-inserted) being dispersed from both below and above the insert in an evenly distributed and formed fashion. As with previous variants, the powder can include a two part structural foam or any other plasticized syrup, soup or thin density composition which is expanded and cured (such as through the addition of a suitable catalyst) to evenly coat between and around the pallet upper deck and legs.

Figure 15:
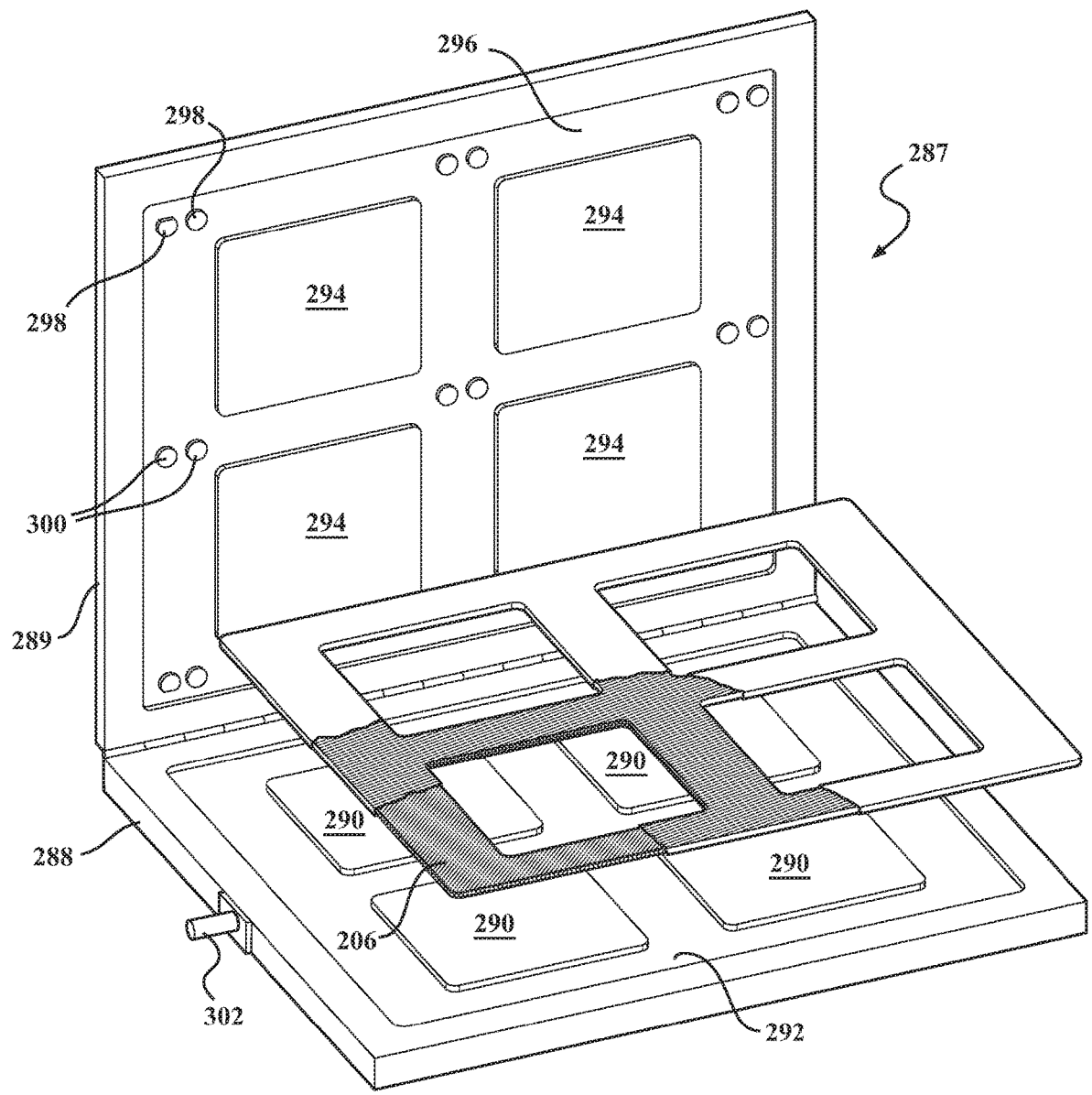
FIG. 15 is an illustration of a similar mold assembly in which a heated mold can be closed and rotated and/or vibrated to ensure even powder distribution across and between the substrate material.

FIG. 15 is an illustration of a similar mold assembly 287, such as for coating the lower deck (again at 206 from FIG. 6) in which a heated mold including a base 288 and a hinged lid 289 can be closed and rotated and/or vibrated to ensure even powder distribution across and between the substrate material associated with the formation of the coating around the lower deck (again at 206). The square aperture profile of the lower deck in this variant is assisted by the cavity profile of the lower mold half 288, such including embossed profiles 290 within the lower cavity interior 292, these receiving the pre-configured and assembled lower deck.

Without elaborating further, it is understood that the initial formation of the lower deck 206 (or any material substrate construction according to the present teachings), such as from bamboo strips, reeds or other fibers, can be accomplished in a separate operation using a jig or fixture, such further including the provisional of an initial adhesive or binder suitable for retaining the integrity of the insert materials prior to and during the subsequent structural foam injection and curing operation.

The hinged lid 289 includes a similar matching array of embossed (or alternately recessed) profiles 294 defined within a mating upper cavity interior 296. The upper lid defined cavity interior further includes corner projection details, at 298 and 300, which (upon formation of the structural foam) correspond to the recessed details shown at 244 in FIG. 10 for receiving the underside projections 242 of the vertical legs and integrated upper deck (also FIG. 9).

As with the mold 272, the lower deck coating mold is rotated about aligning posts 302 for ensuring even distribution of a plasticized powder which can be pre-introduced into the mold. Either of the molds 272 and 287 can further be heated and/or vibrated to accommodate both the distribution and setting/curing/expanding of the coating composition in the manner desired to completely coat the structural article.

Figure 16:
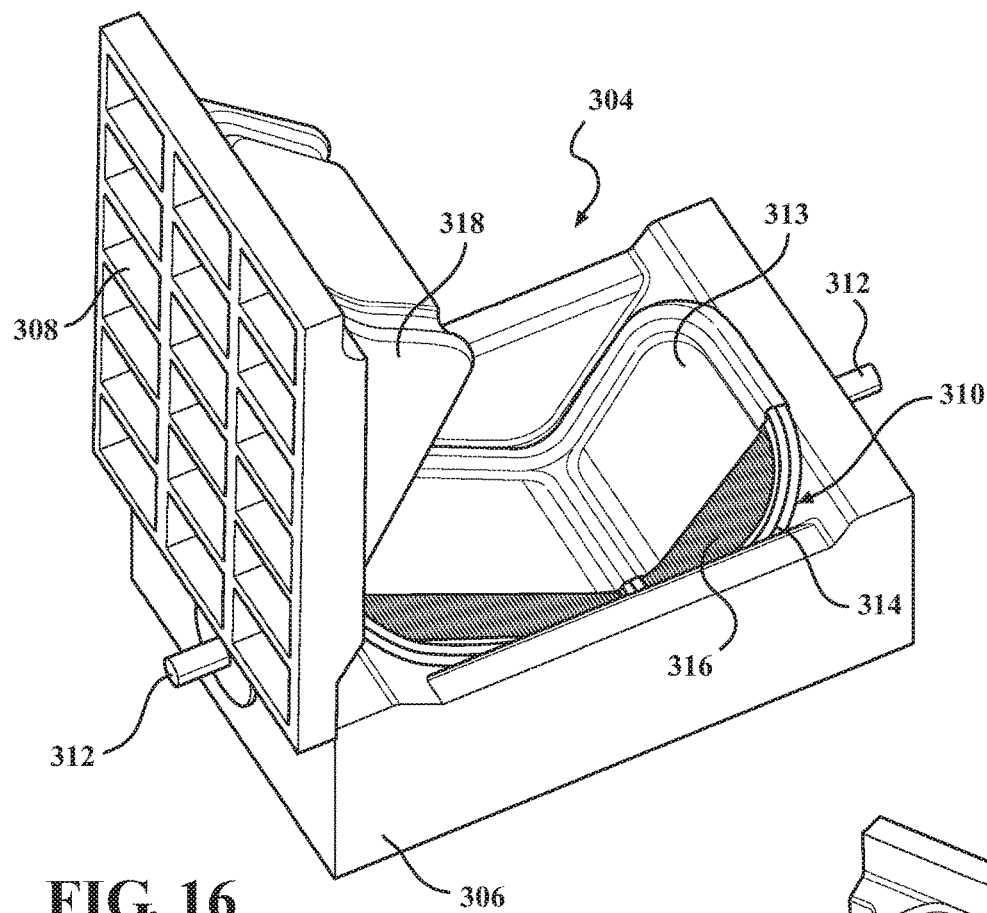
FIG. 16 is an illustration of a further encapsulation hinge mold assembly for coating a natural or man-made structural article configured as a seat and including a rotary style mold assembly.

FIG. 16 is an illustration, generally at 304, of a further encapsulation hinge mold assembly for coating a natural or man-made structural article configured as a seat and including a rotary style mold assembly with a base 306 and a hinged lid 308. Upon closing, the base and lid define mating interior cavities within which is pre-placed a framing structure, at 310, such as associated with a seat or other furniture style supporting article and which can include any natural or manmade material not limited to bamboo, sugar cane, fiber strands, metal, carbon fiber and the like.

The lower or base mold further includes rotary mounting posts, at 312, which upon pre-placing the framing structure insert along with a volume of powder or two part plasticized structural foam syrup, permit the mold to be closed and subsequently rotated (or an in alternate variant shaken or vibrated) about the defined axis. In this manner, the coating material (at 313) is successively distributed, expanded and cured/hardened to coat the framing structure and in particular the outer larger frame of the structure (see at 314) along with the smaller diameter mesh weave portions (further at 316).

Figure 17:
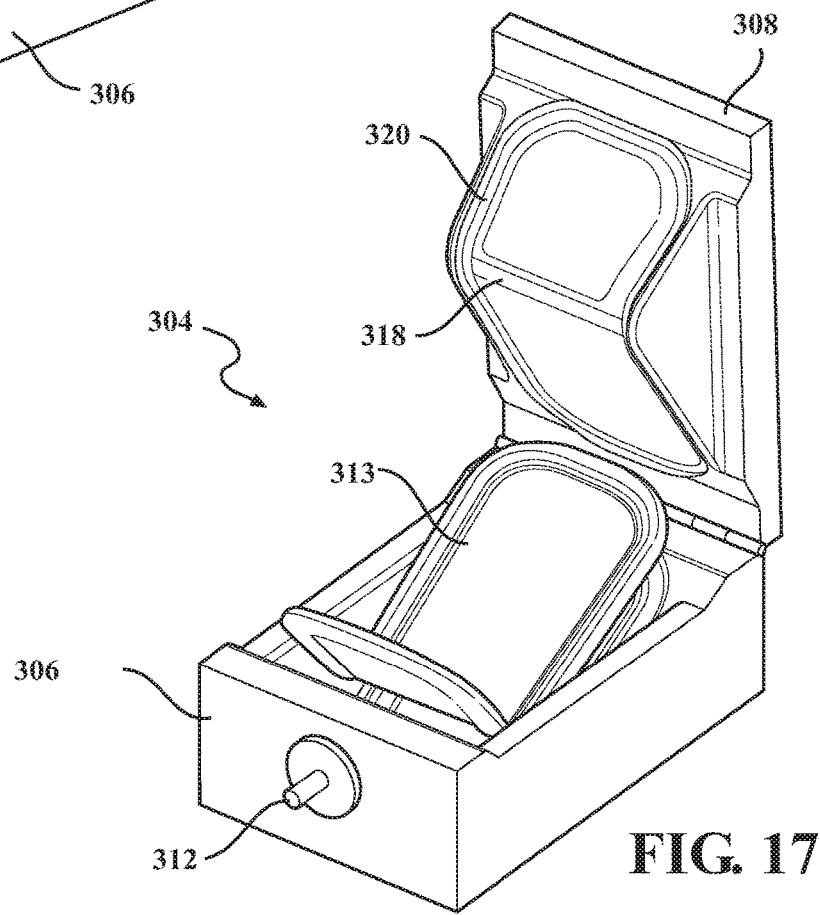
FIG. 17 is a succeeding illustration to FIG. 16 of a finished part having an encapsulated frame structure and attachment brackets, such as is completed and ready for additional assembly with upholstery or other final assembly.

The rotated view of FIG. 17 (which is a succeeding illustration to FIG. 16) illustrates a finished part having an encapsulated frame structure and attachment brackets, such as is completed and ready for additional assembly with upholstery or other final assembly. Also shown in additional detail is the configuration of the inner mold cavity defining structure, such including profile 318 with outer perimeter channel 320 and which, in combination with the underside supporting profile of the base mold cavity largely hidden from view, seats and supports the pre-fabricated structural article (such as again bamboo stalks or strands in combination with any mesh or ply-fiber material).

Figure 18:
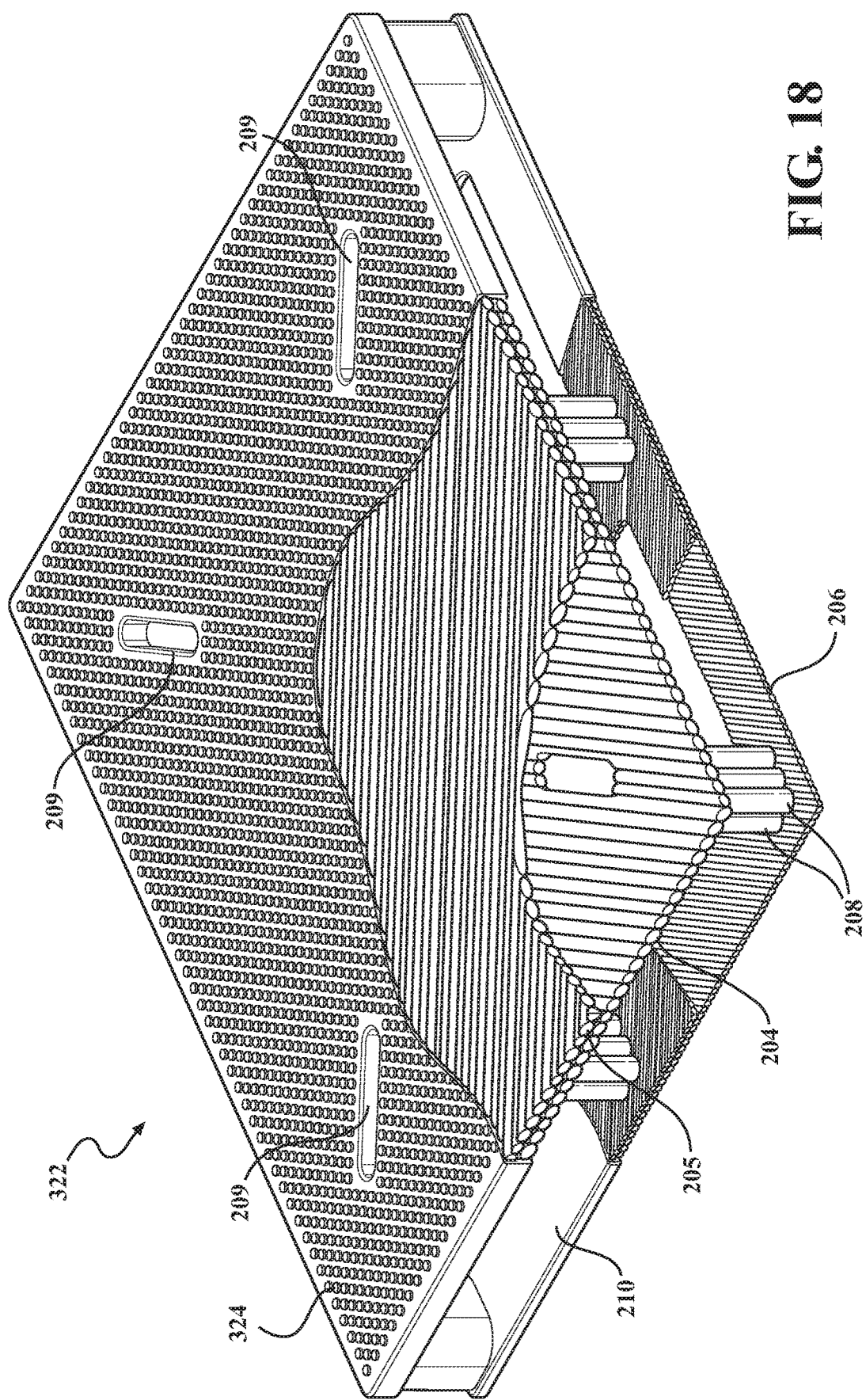
FIG. 18 is a perspective cutaway illustration of a pallet style according to a further related variant and illustrating a bamboo structure encapsulated within an outer plasticized structural foam material.
Figure 19:
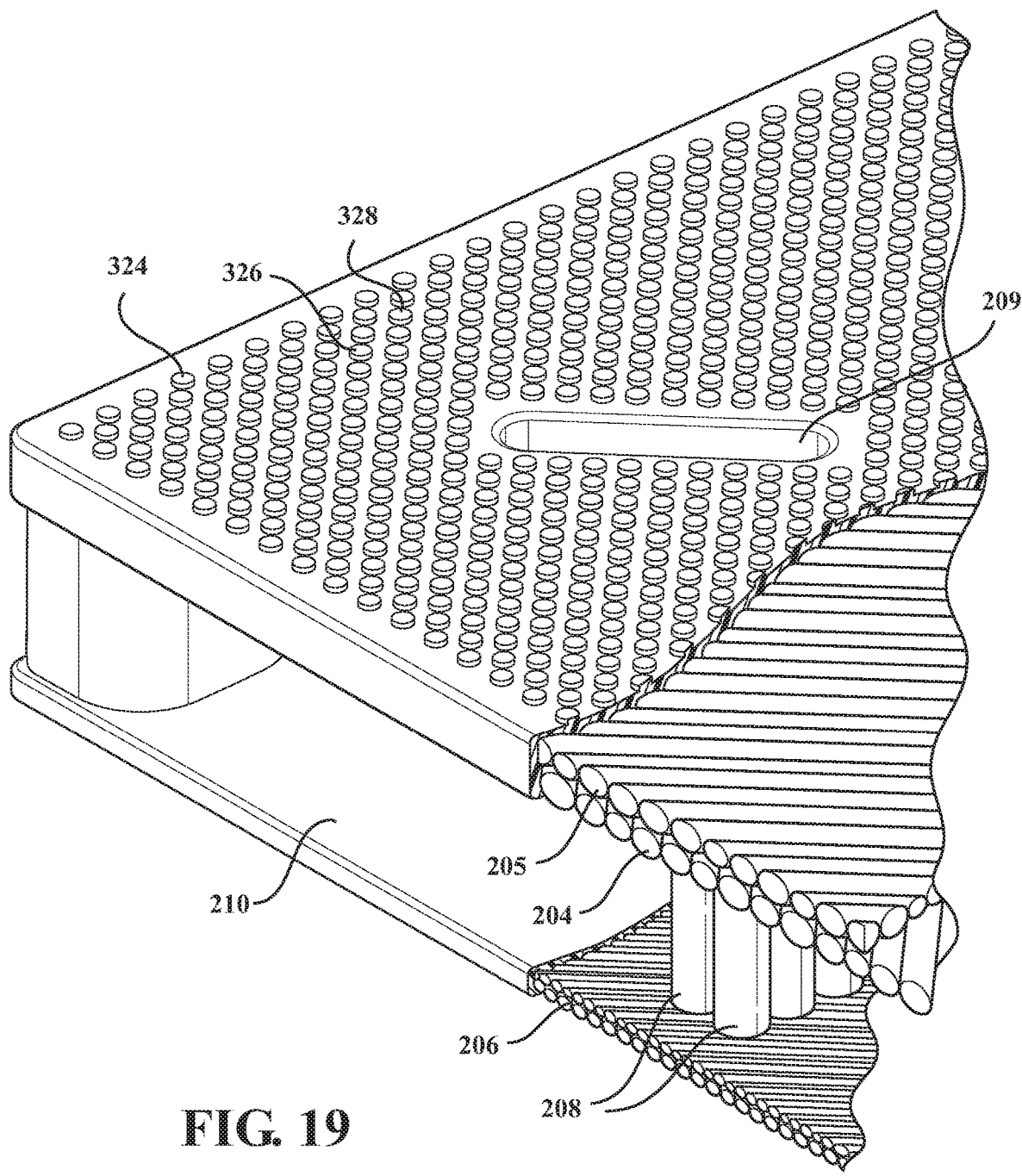
FIG. 19 is an enlarged illustration of FIG. 18 and better illustrating the structural foamed surface tread pattern which is configured into the pallet article, such providing enhanced gripping and anti-skidding properties.

Proceeding to FIG. 18, a perspective cutaway illustration is generally shown at 322 of a pallet style according to a further related variant, such illustrating a bamboo structure similar to those disclosed in relation to previous embodiments (see again FIG. 6), and such being encapsulated within an outer plasticized structural foam material which is associated with the coated portion of the upper exposed deck or tier (see also bamboo substrate layers 204/205 as previously described). As further depicted in the enlarged view of FIG. 19, better illustrated is a structural foamed surface tread pattern, such including multiple protuberances or projections (see at 324, 326, 328, et seq.) which are configured into the pallet article to provide enhanced gripping and anti-skidding properties.

Although not shown, the design of the supporting cavity mold base or lid underside (such depending upon the pre-placement and orientation of the structural supporting insert) is understood to include any suitable pattern or interior surface configuration which, upon pre-placement of the structural insert material and subsequent injection of the two part or other catalysis inducing structural foam material, provides for the configuration of the outer pattern upon the upper deck surface of the article 322 in the manner depicted. It is also understood that the patterning and dimensioning of the surface protuberances can be varied dependent upon the design configuration of the mold interior surfaces, as well as the intended use application of the completed article. It is also again envisioned and understood that any of filters, grit fibers, or other additives may be entrained within the structurally forming plastic foam in order to provide enhancement to the desired gripping and retention properties is provides.

Figure 20:
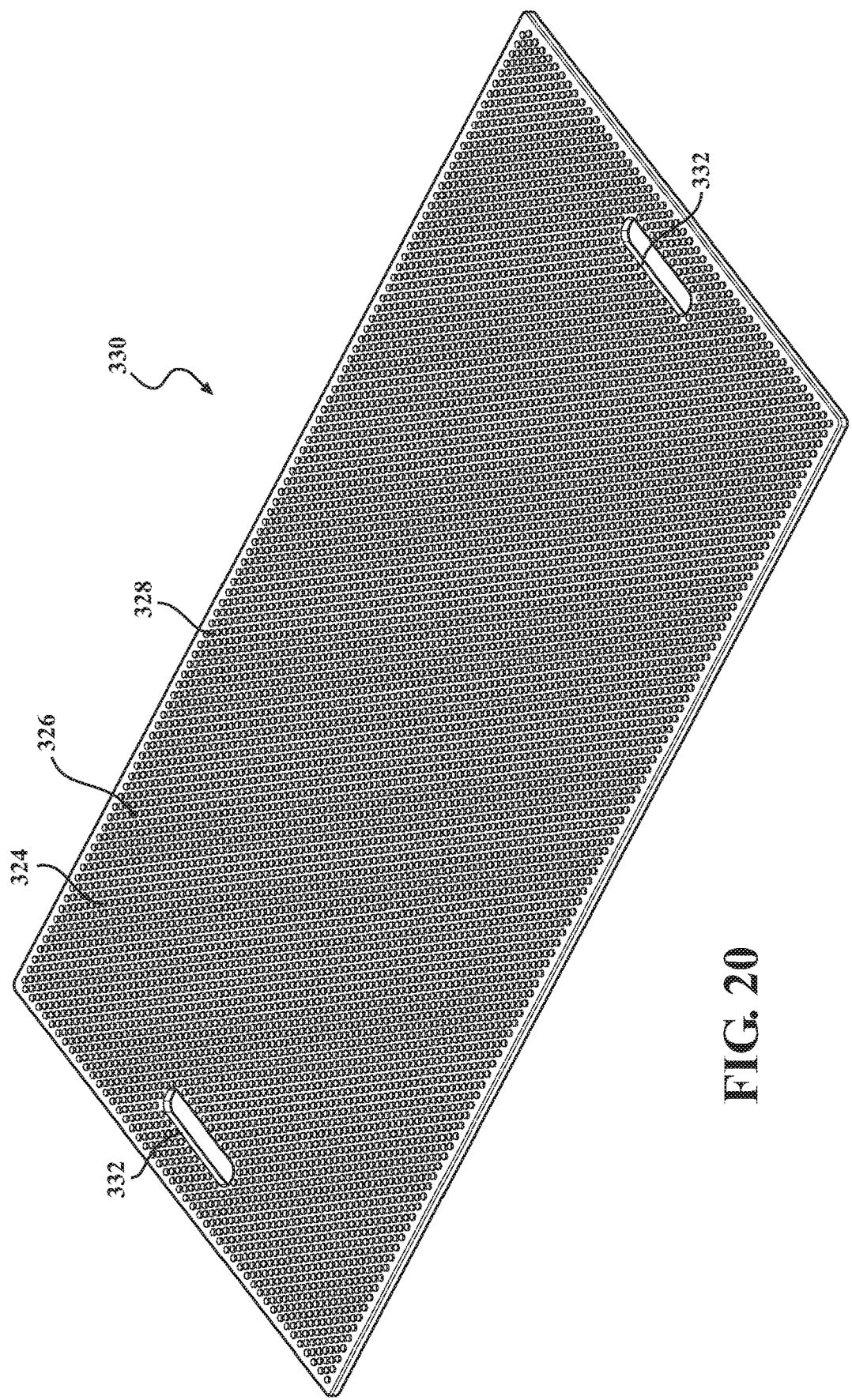
FIG. 20 is an illustration of a further structural article in the form of a multi-purpose ply-fiber board encapsulated in the foam material, such being capable of supported upon loose, muddy or irregular ground surface locations and which are in particularly useful in providing a stable and temporary road, path or other staging area for providing support.

Finally, and referring to FIG. 20, an illustration is provided at 330 of a further structural article in the form of a multi-purpose ply-fiber board encapsulated in the foam material. The ply-fiber board can again include any naturally occurring (e.g. bamboo, stalks, fibers, etc.) or synthetic structural insert material, any of which is pre-formed prior to placement within a suitably configured mold cavity and subjected to the two part or other structural foam expanding material.

As further shown, the structural article 330 exhibits a planar and thin configuration, such including any 4'×4', 4'×8' or other dimensioned board having a nominal thickness (e.g. under 1") and so that such is capable of supported upon loose, muddy or irregular ground surface locations (not shown). As further depicted, any arrangement of surface protuberances (again depicted at 324, 326, 328, et seq.) or other patterning can be configured upon upper surface of the board shaped article. In this manner, the ply-fiber coated board 330 is particularly useful in providing a stable and temporary road, path or other staging area for providing support to any of construction equipment or the like. The board shaped articles each further include handholds, see at 332, and are further capable of being conveniently stacked for storage during periods of non-use.

Having described my invention, other and additional preferred embodiments will become apparent to those skilled in the art to which it pertains, and without deviating from the scope of the appended claims.

I claim:

1. A continuous assembly for producing structural articles, comprising:
   a continuous and closed loop conveyor;
   a plurality of molds, supported upon said conveyor, each having a base including a cavity interior which defines a negative of the structural article to be produced and a hinged lid;
   a delivery conveyor for supplying a plurality of structural inserts;
   a first lift and transfer robot for placing said inserts in succession within a cavity interior of each of said molds;
   a conduit extending from a tank positioned within an interior enclosure defined by said closed loop conveyor, said tank holding at least one of a flowable plasticized or a structural forming foam material, said conduit supplying a delivery manifold positioned overhead each mold for introducing a volume of said material within said mold either prior or subsequent to insertion of the insert;
   the foam curing and setting in encapsulating fashion around the insert in order to form the structural article; and
   a second lift and transfer robot for removing the structural article from the mold for placement upon a removal conveyor.

2. The assembly of claim 1, the structural forming foam further comprising a two part material introduced into each individual mold.

3. The assembly of claim 1, further comprising a removal robot located proximate said continuous and closed loop conveyor in proximity to said inspection stations, said removal robot being instructed to remove dirty or damaged molds to a U shaped repair conveyor prior to replacing upon said closed loop conveyor prior to initiation of a further operating cycle.

4. The assembly of claim 1, the structural articles each having a specified shape and size and including any bundled or aggregated manmade or naturally occurring material not limited to any of bamboo, burlap, reeds, fiber strands or the like.

5. The assembly of claim 1, the flowable plasticized or structuring forming material further comprising any of a two part mix composition, a polyurethane, polyurea, polypropylene, polyethylene, or bio plastic foam.

6. The assembly of claim 5, the material further comprising any infused filler not limited to a natural or synthetic/man-made fiber.

7. The assembly of claim 1, further comprising said mold having an elongated body for receiving the structural insert in the form of a plurality of lengths of elongated bamboo or pre-formed strands for producing an elongated part not limited to a 2x4 or 4x4 beam and an I beam structure.

8. The assembly of claim 1, said mold further comprising at least one book mold with mating layers for producing a sheet-like coated article.

9. The assembly of claim 8, the book mold further comprising multiple hinged or stacked layers defining alternating top/bottom cavity profiles on opposite sides for producing a plurality of the sheet-like articles.

10. The assembly of claim 1, said mold further comprising any of a rotating or vibration inducing mold structure for coating the structural article.

11. The assembly of claim 1, further comprising said mold being heated to facilitate coating and curing of the structural article.

12. The assembly of claim 1, further comprising at least one attachment bracket secure to the structural insert prior to application of the outer foam coating.

13. The assembly of claim 12, the structural insert further comprising a seat or like furniture article having a bamboo frame with an interior fiber mesh weave.

14. The assembly of claim 1, the outer plasticized foam coating further comprising an irregular surface pattern not limited to a plurality of protuberances for providing anti skid support.

15. The assembly of claim 14, the structural insert further comprising any of a pallet or elongated plyfiber board.

16. The assembly of claim 1, further comprising each of inspection and cleaning stations following removal of the structural article from the mold and receipt of a subsequent insert.

17. The assembly of claim 16, said inspection station further comprising optical probes for assessing the cavity defining interior of each mold.

18. The assembly of claim 16, said cleaning station further comprising a second tank positioned within said enclosure along with said tank holding said at least one of the flowable plasticized or structural forming foam materials, said second tank delivering a cleaning solution to said mold interior.

* * * * *